United States Patent
Tetsuka et al.

(10) Patent No.: US 9,383,011 B2
(45) Date of Patent: Jul. 5, 2016

(54) SHIFT POSITION DETECTING DEVICE

(71) Applicant: HONDA MOTOR CO., LTD., Tokyo (JP)

(72) Inventors: Takashi Tetsuka, Wako (JP); Takashi Hotei, Wako (JP); Dai Arai, Wako (JP); Atsushi Chiba, Wako (JP); Kenichi Tamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 205 days.

(21) Appl. No.: 14/294,500

(22) Filed: Jun. 3, 2014

(65) Prior Publication Data

US 2015/0000448 A1  Jan. 1, 2015

(30) Foreign Application Priority Data

Jun. 28, 2013  (JP) .................................. 2013-136928

(51) Int. Cl.
*B60W 10/06* (2006.01)
*B60W 10/11* (2012.01)
*F16H 63/18* (2006.01)
*F16H 59/70* (2006.01)

(52) U.S. Cl.
CPC ................ *F16H 63/18* (2013.01); *F16H 59/70* (2013.01); *Y10T 74/2003* (2015.01)

(58) Field of Classification Search
None
See application file for complete search history.

(56) References Cited

U.S. PATENT DOCUMENTS

| 6,339,325 B1* | 1/2002 | Oda ........................ F16H 59/70 324/207.2 |
| 6,683,263 B1* | 1/2004 | Scheib ..................... F16H 59/70 200/61.88 |
| 2006/0160660 A1* | 7/2006 | Zenno ................... B60W 10/02 477/114 |
| 2010/0107792 A1* | 5/2010 | Saitoh ..................... F16H 63/18 74/337.5 |
| 2010/0107796 A1* | 5/2010 | Tomoda .................. F16H 63/18 74/473.1 |

FOREIGN PATENT DOCUMENTS

JP  2011-196517 A  10/2011

* cited by examiner

*Primary Examiner* — Edwin A Young
(74) *Attorney, Agent, or Firm* — Birch, Stewart, Kolasch & Birch, LLP

(57) ABSTRACT

A shift position detecting device that determines a shift position based on a detection logic formed of a combination of turning on or off of a plurality of switches that are fixedly arranged at least one by one at positions corresponding to a plurality of detecting object portion rows mounted on a shift drum. An accurate shift position can be detected even if there is an irregularity in switching timings of switching modes of the plurality of switches. A shift position detecting member establishes the shift position as a new shift position and outputs shift position information, while when the detection logic after the transition is a detection logic other than the detection logic corresponding to the changeable shift position, sets the new shift position not yet established and outputs information corresponding to non-establishment of the shift position.

20 Claims, 11 Drawing Sheets

SHIFT POSITION DETECTING DEVICE

CROSS-REFERENCE TO RELATED APPLICATIONS

The present application claims priority under 35 USC 119 to Japanese Patent Application No. 2013-136928 filed Jun. 28, 2013 the entire contents of which are hereby incorporated by reference.

BACKGROUND OF THE INVENTION

1. Field of the Invention

The present invention relates to a shift position detecting device that includes a plurality of detecting object portion rows each of which has detecting object portions that are arranged at a plurality of places in a spaced-apart manner in the circumferential direction of a shift drum constituting a part of a sequential-type multi-stage transmission that determines a shift position by selectively establishing gear trains of a plurality of shift positions. The detecting object portion rows are mounted on the shift drum. A plurality of switches are fixedly arranged at least one by one at positions corresponding to the plurality of detecting object portion rows such that a switching mode is changed from an OFF state to an ON state in response to the detection of the detecting object portion. A shift position determining means determines a shift position by collating a shift position allocated to a detection logic that is formed of the combination of turning on or off of the switches based on the detection logic.

2. Description of Background Art

JP-A-2011-196517 discloses a shift position detecting device for detecting a shift position based on a plurality of projection rows arranged in a spaced-apart manner in the circumferential direction of an outer periphery of the shift drum with a detection logic that is formed by combining the turning on and off of three switches whose switching modes are changed by pushing the projecting portions of the projection row.

As disclosed in JP-A-2011-196517, in the shift position detecting device where the projection of the projection rows is detected by three switches, there arises irregularity in the timing of switching when the switches are turned from an ON state to an OFF state or from an OFF state to an ON state thus giving rise to a possibility that the combination of turning ON and OFF that differs from an actual shift position instantaneously is generated.

SUMMARY AND OBJECTS OF THE INVENTION

The invention has been made in view of such circumstances. It is an object of an embodiment of the present invention to provide a shift position detecting device that can detect an accurate shift position even when there exists irregularity in switching timing of a switching mode of a plurality of switches.

To achieve the above-mentioned object, according to an embodiment of the present invention, there is provided a shift position detecting device that includes a plurality of detecting object portion rows each of which has detecting object portions that are arranged at a plurality of places in a spaced-apart manner in the circumferential direction of a shift drum constituting a part of a sequential-type multi-stage transmission that establishes a shift position by selectively establishing gear trains of a plurality of shift positions. The plurality of detecting object portion rows are mounted on the shift drum. A plurality of switches are fixedly arranged at least one by one at positions corresponding to the plurality of detecting object portion rows such that a switching mode is changed from an OFF state to an ON state in response to the detection of the detecting object portion. A shift position determining means determines a shift position by collating a shift position allocated to a detection logic that is formed of a combination of turning on and off of the switches based on the detection logic, wherein the shift position determining means includes a shift position establishing part that establishes the shift position as a new shift position when the detection logic makes a transition from a detection logic corresponding to an established shift position in an established state to a detection logic different from the detection logic corresponding to the established shift position and the detection logic after the transition is a detection logic corresponding to a shift position changeable from the established shift position next, and sets the new shift position not yet established when the detection logic after the transition is a detection logic other than the detection logic corresponding to the shift position changeable next, and when a present shift position determined by the collation is a shift position established by the shift position establishing part, the shift position determining means outputs shift position information corresponding to the established shift position, while when the present shift position is not established by the shift position establishing part, the shift position determining means outputs information corresponding to non-establishment of the shift position.

According to an embodiment of the present invention, in a state where a relative arrangement between the switches and the detecting object portion rows is set such that the two switches are brought into an ON state from an OFF state by detecting the detecting object portions individually corresponding to the switches at a specified shift position, to avoid the generation of a detection logic corresponding to a shift position different from the specified shift position although being changeable thereto next from a shift position in front of or behind the specified shift position due to irregularity in detection timing of the two switches, the detecting object portion rows are configured such that timing at which one of both switches is brought into an ON state comes earlier than timing at which the other switch is brought into an ON state when the shift position is changed to the specified position.

According to an embodiment of the present invention, the detecting object portion row includes a plurality of projecting portions that constitute the plurality of detecting object portions arranged in a spaced-apart manner in the circumferential direction of the shift drum and valley portions that are arranged between the projecting portions. The detecting object portion row is constituted as a projection row where the rising of the projecting portion that the other switch detects at the specified shift position is started after the completion of the rising of the projecting portion that one switch detects at the specified shift position.

According to an embodiment of the present invention, a predetermined detection logic corresponding to a predetermined shift position that is expected to be established at the time of starting an engine mounted on a vehicle is set as a detection logic that is not generated at any moment other than the predetermined shift position, and the shift position determining means that is started together with the engine establishes an initial shift position after the starting of the shift position determining means in response to the detection of the predetermined detection logic.

According to an embodiment of the present invention, the predetermined shift position is a neutral position.

According to an embodiment of the present invention, the predetermined shift position is a second speed position.

According to an embodiment of the present invention, the multi-stage transmission is configured such that a neutral position is arranged between a first speed position and a second speed position and a shift position is changeable among the first to the sixth speed positions, and a predetermined detection logic corresponding to at least one of the first speed position, the neutral position and the second speed position that are set as predetermined shift positions expected to be established at the time of starting an engine mounted on a vehicle is set as a detection logic that is not generated at any moment other than the predetermined shift position at least between the first speed position and the third speed position, and the shift position determining means that is started together with the engine establishes an initial shift position after starting the shift position determining means in response to the detection of the predetermined detection logic.

According to an embodiment of the present invention, the relative arrangement between the first, second and third switches and the detecting object portion rows is set such that a state where the detection logic that is the combination of "1" generated when the first, second and third switches detect the detecting object portions and are brought into an ON state and "0" generated when the first, second and third switches are brought into an OFF state becomes "0, 0, 0" is generated when the shift position is changed between shift positions on a high speed side of third or more speed positions, and the detection logic to a predetermined detection logic from a detection logic other than the "0, 0, 0" when the shift position is changed to the predetermined shift position, and the shift position determining means outputs information corresponding to non-establishment of the shift position when the predetermined detection logic is generated immediately after the generation of the detection logic of the "0, 0, 0".

According to an embodiment of the present invention, to the shift position of the multi-stage transmission that is configured to change a speed position among first to sixth speed positions while arranging a neutral position between the first speed position and the second speed position, detection logics described in a following table where "1" generated when the first, the second and the third switches detect the projecting portions and are brought into an ON state and "0" generated when the first, the second and the third switches are in an OFF state are combined with each other is allocated,

TABLE 1

|              | first switch | second switch | third switch |
|--------------|--------------|---------------|--------------|
| first speed  | 1            | 0             | 0            |
| neutral      | 1            | 1             | 1            |
| second speed | 1            | 1             | 0            |
| third speed  | 0            | 1             | 1            |
| fourth speed | 1            | 0             | 1            |
| fifth speed  | 0            | 1             | 0            |
| sixth speed  | 0            | 0             | 1            | the first and the second switches are arranged to correspond to a common projection row such that the second switch (SB) is arranged at the shift position higher than the shift position of the first switch by one speed, at the neutral position, rising of the projecting portion from a first speed side detected by the third switch is set earlier than the projecting portion detected by the second switch, and rising of the projecting portion from a second speed side is set earlier than the projecting portion detected by the first switch, at the second speed position, rising of the projecting portion detected by the second switch from a neutral side is set earlier than the projecting portion detected by the first switch, at the third speed position, rising of the projecting portion detected by the third switch from a fourth speed side is set earlier than the projecting portion detected by the second switch, and at the fourth speed position, rising of the projecting portion detected by the first switch from a fifth speed side is set earlier than the projecting portion detected by the third switch.

According to an embodiment of the present invention, the shift position detecting device further includes a shift indicator that performs a display operation based on information from the shift position determining means, the shift indicator displays a shift position based on an input of the shift position information from the shift position determining means and the shift indicator displays an object to be displayed other than the shift position when the information corresponding to non-establishment of the shift position is inputted from the shift position determining means.

According to an embodiment of the present invention, at the time of making a transition from the detection logic corresponding to the established shift position to the detection logic different from the detection logic corresponding to the established shift position, when the detection logic after a transition turns out to be the detection logic corresponding to the shift position to which the shift from the present established shift position cannot be made, such a shift position is not established as a new shift position. When the detection logic after the transition is the detection logic corresponding to the shift position to which the shift from the present established shift position can be made, the shift position is established as a new shift position, and shift position information corresponding to the established shift position is outputted. Accordingly, the determination of the accurate shift position can be performed such that the shift position that has no possibility of being selected as the destination of shift is not outputted.

According to an embodiment of the present invention, when irregularity is generated in detection timing where two switches detect detecting object portions respectively at the specified shift position, although the shift position is changeable to the specified shift position from the shift positions in front of and behind the specified shift position next, there exists a possibility that the detection logic corresponding to the shift position different from the specified shift position is generated. By setting timing at which one switch is turned on at the specified shift position earlier than timing at which, the other switch is turned on at the specified shift position, it is possible to mechanically eliminate a possibility that the detection logic that does not correspond to the specified shift position that is an actual shift position is generated. Thus, a more reliable determination of the shift position can be realized.

According to an embodiment of the present invention, the detecting object portion row includes the plurality of projecting portions that constitute the plurality of detecting object portions and the valley portions each of which is arranged between each two projecting portions, and the other projecting portion that the other switch detects starts rising after the completion of rising of one projecting portion that one switch detects. Accordingly, it is possible to completely eliminate a possibility that an irregularity is generated in detection timings of two switches.

According to an embodiment of the present invention, the shift position determining means is started in response to turning on of the main switch, and the detection logic for establishing the initial shift position after starting the shift position determining means is set as the predetermined detection logic that is not generated at any moment at shift positions other than the predetermined shift position. Accordingly, the initial shift position can be surely established.

According to an embodiment of the present invention, the neutral position is set as the predetermined shift position in view of a fact that the shift position that is used frequently at the time of starting the engine is the neutral position. Accordingly, the shift position can be established at a relatively early stage after starting the engine.

According to an embodiment of the present invention, the second speed position is set as the predetermined shift position in view of a case where the second speed position is used at the time of starting a vehicle. Accordingly, the shift position can be established at a relatively early stage after starting the engine.

According to an embodiment of the present invention, in view of a fact that the shift position on a high-speed side exceeding the third speed position is hardly taken at a relatively early stage after starting the engine, and the shift position that is expected to be established at the time of starting the engine is the first speed position, the neutral position or the second speed position in many cases. Thus, at least one of the first speed position, the neutral position and the second speed position is set as the predetermined shift position, and the predetermined detection logic corresponding to the predetermined shift position is established as the detection logic that is not generated at any moment other than the predetermined shift position from at least the first speed position to the third speed position whereby the shift position can be established at a relatively early stage after starting the engine.

According to an embodiment of the present invention, in the multistage transmission of six shift stages, even when the predetermined detection logic appears at the shift position of the third or more speed position, the predetermined detection logic appears immediately after "0, 0, 0." Thus, it is possible to effectively eliminate the establishment of the shift position other than the predetermined shift position.

According to an embodiment of the present invention, by allocating the detection logics in the Table to the respective shift positions, in performing the shift position determination of the neutral position and the first to sixth speed positions using three switches, the shift position information and information corresponding to non-establishment of the shift position can be outputted using two projection rows that constitute the minimum number of projection rows. Further, by setting rising timings of the projecting portions at the neutral position, the second speed position, the third speed position and the fourth speed position as described above, it is possible to mechanically eliminate a possibility that the detection logic that does not correspond to the specified shift position that is an actual shift position is generated in the course of a shift change. Thus, a more reliable determination of the shift position can be realized.

According to an embodiment of the present invention, the shift indicator that displays the shift position based on inputting of shift position information displays objects other than the shift position when information corresponding to non-establishment of the shift position is inputted. Thus, the shift position can be accurately grasped.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
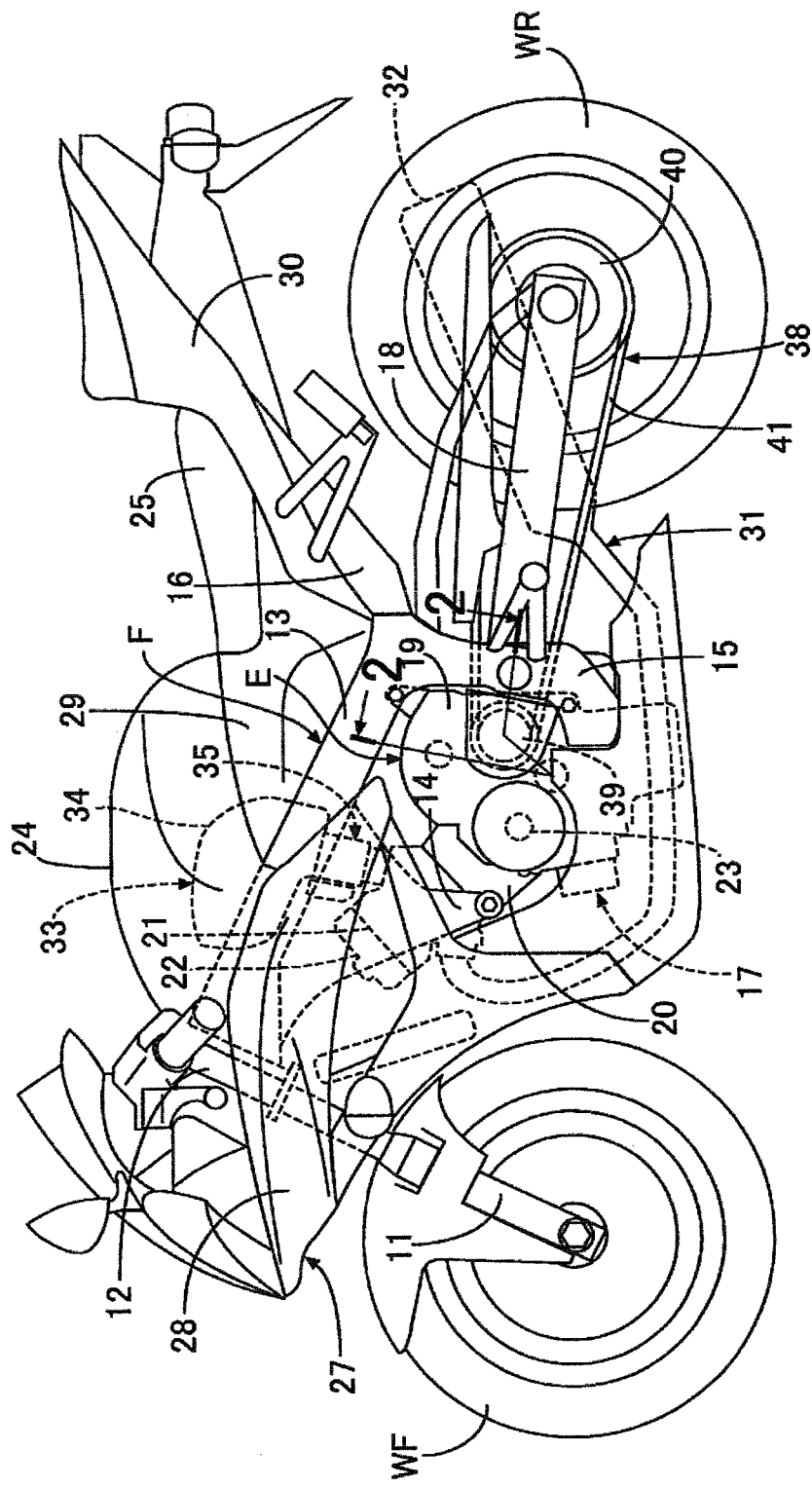
FIG. 1 is a side view of a motorcycle to which the invention is applied.

Hereinafter, an embodiment of the invention is explained by reference to FIG. 1 to FIG. 11. As illustrated in FIG. 1, a vehicle body frame F of a motorcycle includes a head pipe 12 that steerably supports a front fork 11 that pivotally supports a front wheel WF; a main frame 13 that extends rearward and downward from the head pipe 12; an engine hanger 14 that extends downward from a front portion of the main frame 13; a pivot frame 15 that extends downward from a rear portion of the main frame 13 and a seat rail 16 that extends rearward and upward from the rear portion of the main frame 13.

An engine body 17 of an engine E that is arranged below the main frame 13 is supported on the rear portion of the main frame 13, a lower portion of the engine hanger 14 and a lower portion of the pivot frame 15 of the vehicle body frame F. A rear wheel WR driven by power that the engine E generates is pivotally supported on a rear end portion of a swing arm 18. A front end portion of the swig arm 18 is supported on the pivot frame 15 in a vertically swingable manner. A fuel tank 24 is mounted on the main frame 13 above the engine E. A rider's seat 25 arranged behind the fuel tank 24 is supported on the seat rail 16.

A part of the engine E and a part of the vehicle body frame F are covered with a vehicle body cover 27. The vehicle body cover 27 includes a front cowl 28; a pair of left and right side covers 29 that covers a rear lower portion of the fuel tank 24 from both sides and is arranged between the fuel tank 24 and the rider's seat 25; and a rear cowl 30 that is contiguously formed with rear portions of both side covers 29 and extends rearward and upward.

The engine body 17 of the engine E includes a crankcase 19 that rotatably supports a crankshaft 23 having an axis extending in the width direction of the vehicle body frame F; a cylinder body 20 that is joined to an upper end of a front portion of the crankcase 19 with a cylinder axis thereof inclined frontward; a cylinder head 21 that is joined to an upper end of the cylinder body 20 and a head cover 22 that is joined to an upper end of the cylinder head 21. The engine E may be an in-line four-cylinder engine, for example.

An exhaust system 31 connected to a side surface of a front portion of the cylinder head 21 includes an exhaust muffler 32 on a rear end thereof, and the exhaust muffler 32 is arranged on a right side of the rear wheel WR. A side surface of a rear portion of the cylinder head 21 faces in the oblique rearward and upward direction. An intake system 33 connected to a side surface of the rear portion of the cylinder head 21 includes an air cleaner 34 arranged above the head cover 22 in a state where the air cleaner 34 is covered with the fuel tank 24 and a throttle device 35 that is interposed between the air cleaner 34 and the cylinder head 21.

Figure 2:
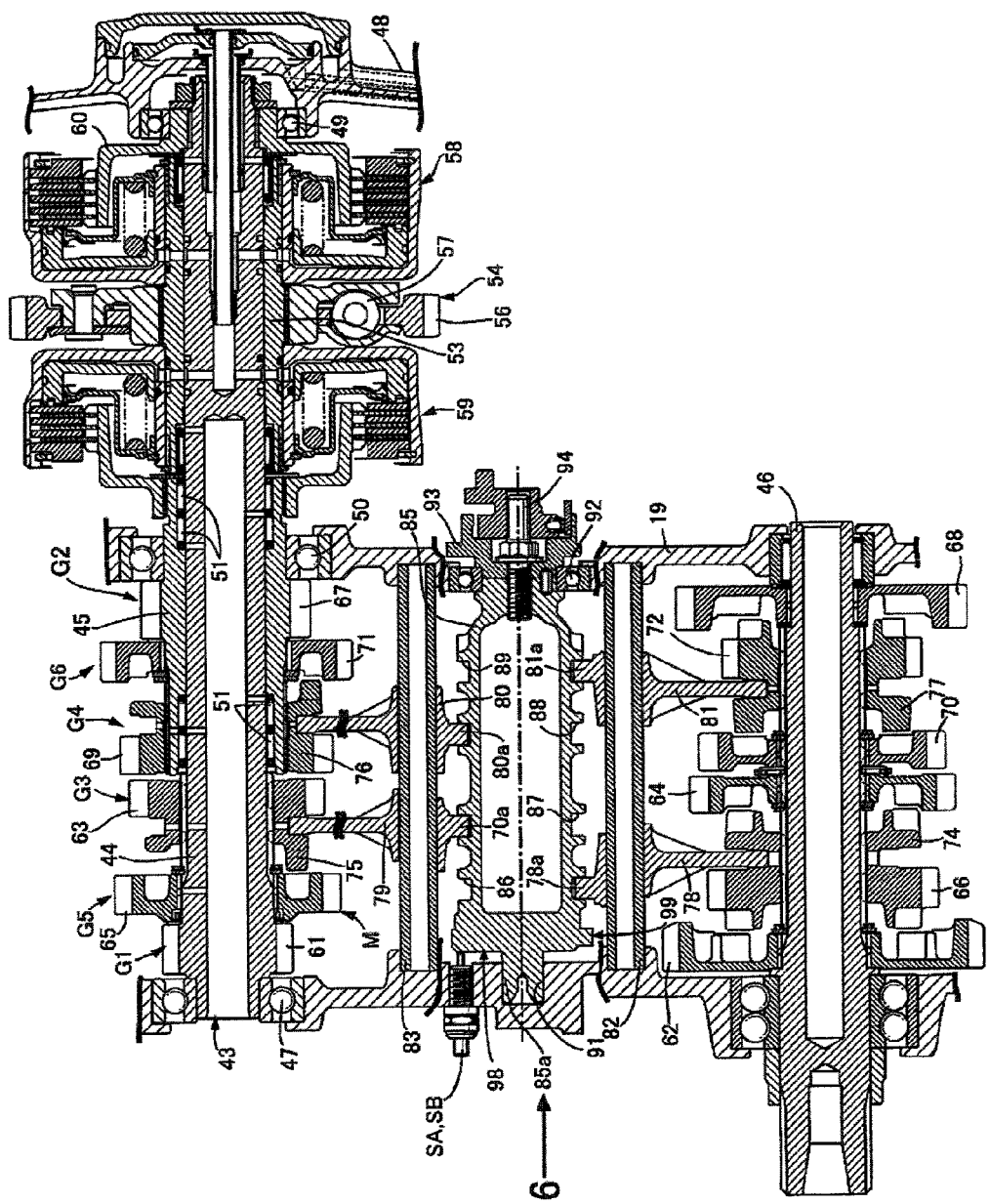
FIG. 2 is a cross-sectional view taken along a line 2-2 in FIG. 1.

In FIG. 2, a sequential-type multistage transmission M is housed in the inside of the crankcase 19. The multistage transmission M is configured such that gear trains of a plurality of shift stages, for example, first-speed to sixth-speed gear trains G1 to G6 that can be selectively established are arranged between a main shaft 43 and a counter shaft 46. An axis of the main shaft 43 and an axis of the counter shaft 46 are arranged parallel to the crankshaft 30. One end of the counter shaft 46 projects from a side surface of the rear portion of the crankcase 19, and rotational power outputted from the counter shaft 46 is transmitted to the rear wheel WR that constitutes a drive wheel by way of a power transmission means 38 as shown in FIG. 1. The power transmission means 38 is constituted such that an endless drive chain 41 extends between and is wound around a drive sprocket 39 fixed to a shaft end of the counter shaft 46 and a driven sprocket 40 mounted on the rear wheel WR coaxially.

The main shaft 43 includes a first shaft 44 and a second shaft 45 that allows the first shaft 44 to coaxially pass therethrough in a relatively rotatable manner. The first-speed gear train G1, the third-speed gear train G3 and the fifth-speed gear train G5 are arranged between the first shaft 44 and the counter shaft 46, while the second-speed gear train G2, the fourth-speed gear train G4 and the sixth-speed gear train G6 are arranged between the second shaft 45 and the counter shaft 46.

The first shaft 44 has a smaller diameter than the second shaft 45. One end portion of the first shaft 44 is rotatably supported on the crankcase 19 by way of a ball bearing 47. The other end side of the first shaft 44 rotatably penetrates the crankcase 19, and the other end portion of the first shaft 44 is rotatably supported on a crankcase cover 48 that is fastened to the crankcase 19 by way of a clutch inner 60 and a ball bearing 49. The second shaft 45 having a larger diameter than the first shaft 44 is rotatably supported on the crankcase 19 by way of a ball bearing 50. An intermediate portion of the first shaft 44 coaxially passes through the second shaft 45 in a relatively rotatable manner, and a plurality of needle bearings 51 are interposed between the first shaft 44 and the second shaft 45.

A power transmission cylindrical shaft 53 that is arranged adjacent to the second shaft 45 in the axial direction is mounted on the other end side of the first shaft 44 in a relatively rotatable manner, and power transmitted from the crankshaft 30 is transmitted to the power transmission cylindrical shaft 53 by way of a primary speed reduction device 54 and a damper spring 57. The primary speed reduction device 54 includes a drive gear (not shown in the drawing) that is rotated together with the crankshaft 30, and a driven gear 56 that is arranged coaxially with the first and second shafts 44, 45 in a state where the driven gear 56 is meshed with the drive gear. The driven gear 56 is connected to the power transmission cylindrical shaft 53 by way of the damper spring 57.

A first hydraulic clutch 58 is arranged between the power transmission cylindrical shaft 53 and the first shaft 44, the clutch inner 60 that the first hydraulic clutch 58 includes is connected to the other end portion of the first shaft 44 in a relatively non-rotatable manner, and the ball bearing 49 is interposed between the clutch inner 60 and the crankcase cover 48. A second hydraulic clutch 59 that sandwiches the primary speed reduction device 54 between the second hydraulic clutch 59 and the first hydraulic clutch 58 is arranged between the power transmission cylindrical shaft 53 and the second shaft 45.

When the first hydraulic clutch 58 is in a power transmission state so that power is transmitted to the first shaft 44 from the crankshaft 30, power can be transmitted to the counter shaft 46 from the first shaft 44 by way of the gear train selectively established from the first-speed, third-speed and fifth-speed gear trains G1, G3 and G5. When the second hydraulic clutch 59 is in a power transmission state so that power is transmitted to the second shaft 45 from the crankshaft 30, power can be transmitted to the counter shaft 46 from the second shaft 45 by way of the gear train selectively established from the second-speed, fourth-speed and sixth-speed gear trains G2, G4 and G6.

The first-speed, third-speed and fifth-speed gear trains G1, G3 and G5 are arranged between a portion of the first shaft 44 that sandwiches the second shaft 45 with the first and second hydraulic clutches 58, 59, that is, the portion of the first shaft 44 on one end side that projects from the second shaft 45 and the counter shaft 46. The first-speed gear train G1 includes a first-speed drive gear 61 that is integrally formed with the first counter shaft 44, and a first-speed driven gear 62 that is supported on the counter shaft 46 in a relatively non-rotatable manner and is meshed with the first-speed drive gear 61. The third-speed gear train G3 includes a third-speed drive gear 63 that is joined to the first shaft 44 in a relatively non-rotatable manner while being slidable in the axial direction, and a third-speed driven gear 64 that is supported on the counter shaft 46 in a relatively rotatable manner and is meshed with the third-speed drive gear 63. The fifth-speed gear train G5 includes a fifth-speed drive gear 65 arranged between the first-speed and third-speed drive gears 61, 63 and is supported on the first shaft 44 in a relatively rotatable manner, and a fifth-speed driven gear 66 that is joined to the counter shaft 46 in a relatively non-rotatable manner while being slidable in the axial direction and is meshed with the fifth-speed drive gear 65.

The second-speed gear train G2 includes a second-speed drive gear 67 that is integrally formed with the second shaft 45, and a second-speed driven gear 68 that is supported on the counter shaft 46 in a relatively rotatable manner and is meshed with the second-speed drive gear 67. The fourth-speed gear train G4 includes a fourth-speed drive gear 69 that is joined to the second shaft 45 in a relatively non-rotatable manner while being slidable in the axial direction, and a fourth-speed driven gear 70 that is supported on the counter shaft 46 in a relatively rotatable manner and is meshed with the fourth-speed drive gear 69. The sixth-speed gear train G6 includes a sixth-speed drive gear 71 that is arranged between the second-speed and fourth-speed drive gears 67, 69 and is supported on the second shaft 45 in a relatively rotatable manner, and a sixth-speed driven gear 72 that is joined to the counter shaft 46 in a relatively non-rotatable manner while being slidable in the axial direction and is meshed with the sixth-speed drive gear 71.

A first shifter 74 is supported on the counter shaft 46 in a relatively non-rotatable manner and in an axially slidable manner between the first-speed driven gear 62 and the third-speed driven gear 64, and the fifth-speed driven gear 66 is integrally formed with the first shifter 74. The first shifter 74 is slidable among a position where the first shifter 74 is engaged with the first-speed driven gear 62, a position where the first shifter 74 is engaged with the third-speed driven gear 64, and a position where the first shifter 74 is engaged with neither the first-speed driven gear 62 nor the third-speed driven gear 64. A second shifter 75 is supported on the first shaft 44 in a relatively non-rotatable manner and in an axially slidable manner in a state where the second shifter 75 sandwiches the fifth-speed drive gear 65 between the second shifter 75 and the first-speed drive gear 61, and the third-speed drive gear 63 is integrally formed with the second shifter 75. The second shifter 75 is slidable between a position where the second shifter 75 is engaged with the fifth-speed drive gear 65 and a position where the engagement between the second shifter 75 and the fifth-speed drive gear 65 is released.

When the first shifter 74 is engaged with the first-speed driven gear 62 in a state where the second shifter 75 is not engaged with the fifth-speed drive gear 65, the first-speed gear train G1 is established. When the first shifter 74 is engaged with the third-speed driven gear 64 in a state where the second shifter 75 is not engaged with the fifth-speed drive gear 65, the third-speed gear train G3 is established. When the second shifter 75 is engaged with the fifth-speed drive gear 65 in a state where the first shifter 74 is engaged with neither the first-speed driven gear 62 nor the third-speed driven gear 64, the fifth-speed gear train G5 is established.

A third shifter 76 is supported on the second shaft 45 in a relatively non-rotatable manner and in an axially slidable manner in a state where the sixth-speed drive gear 71 is sandwiched between the third shifter 76 and the second-speed drive gear 67. The fourth-speed drive gear 69 is integrally formed with the third shifter 76. The third shifter 76 is slidable between a position where the third shifter 76 is engaged with the sixth-speed drive gear 71 and a position where the engagement between the third shifter 76 and the sixth-speed drive gear 71 is released. Further, a fourth shifter 77 is supported on the counter shaft 46 in a relatively non-rotatable manner and in an axially slidable manner between the second-speed driven gear 68 and the fourth-speed driven gear 70. The sixth-speed driven gear 72 is integrally formed with the fourth shifter 77. The fourth shifter 77 is slidable among a position where the fourth shifter 77 is engaged with the second-speed driven gear 68, a position where the fourth shifter 77 is engaged with the fourth-speed driven gear 70, and a position where the fourth shifter 77 is engaged with neither the second-speed driven gear 68 nor the fourth-speed driven gear 70.

When the fourth shifter 77 is engaged with the second-speed driven gear 68 in a state where the third shifter 76 is not engaged with the sixth-speed drive gear 71, the second-speed gear train G2 is established. When the fourth shifter 77 is engaged with the fourth-speed driven gear 70 in a state where the third shifter 76 is not engaged with the sixth-speed drive gear 71, the fourth-speed gear train G4 is established. When the third shifter 76 is engaged with the sixth-speed drive gear 71 in a state where the fourth shifter 77 is engaged with neither the second-speed driven gear 68 nor the fourth-speed driven gear 70, the sixth-speed gear train G6 is established.

The first to fourth shifters 74, 75, 76, 77 are rotatably held by first to fourth shift forks 78, 79, 80, 81 respectively. The first and fourth shift forks 78, 81 are supported on a first shift fork shaft 82 in an axially slidable manner. The second and third shift forks 79, 80 are supported on a second shift fork shaft 83 in an axially slidable manner. The first and second shift fork shafts 82, 83 are supported on the crankcase 19 while having respective axes thereof arranged parallel to the first and second shafts 44, 45 and the counter shaft 46.

A shift drum 85 that has an axis thereof arranged parallel to the first and second shafts 44, 45 and the counter shaft 46 is supported on the crankcase 19 in a rotatable manner about an axis of the crankcase 19. Shift pins 78a, 79a, 80a, 81a that are formed on the first to fourth shift forks 78 to 81 respectively in a projecting manner are slidably engaged with first to fourth lead grooves 86, 87, 88, 89 formed on an outer peripheral surface of the shift drum 85. When the shift drum 85 is rotated, the first to fourth shift forks 78 to 81 slide in the axial direction in accordance with patterns of the first to fourth lead grooves 86 to 89.

A small-diameter shaft portion 85a is coaxially and integrally formed on one end portion of the shift drum 85 in a projecting manner. One end portion of the shift drum 85 is rotatably supported on the crankcase 19 by fitting the small-diameter shaft portion 85a into a bottomed support hole 91 formed in the crankcase 19, while the other end portion of the shift drum 85 is rotatably supported on the crankcase 19 by way of a ball bearing 92.

A shift drum center 93 that is rotated together with the shift drum 85 is fixed to the other end portion of the shift drum 85 by a coaxial bolt 94. The shift drum center 93 is rotatably driven intermittently when an actuator not shown in the drawing is operated. When the shift drum 85 is rotatably driven together with the shift drum center 93, the shift drum 85 is rotated so as to sequentially pass a neutral position where none of the first to sixth gear trains G1 to G6 is established and the first-speed position to the sixth-speed position where one of the first to sixth gear trains G1 to G6 is selectively established.

Figure 3:
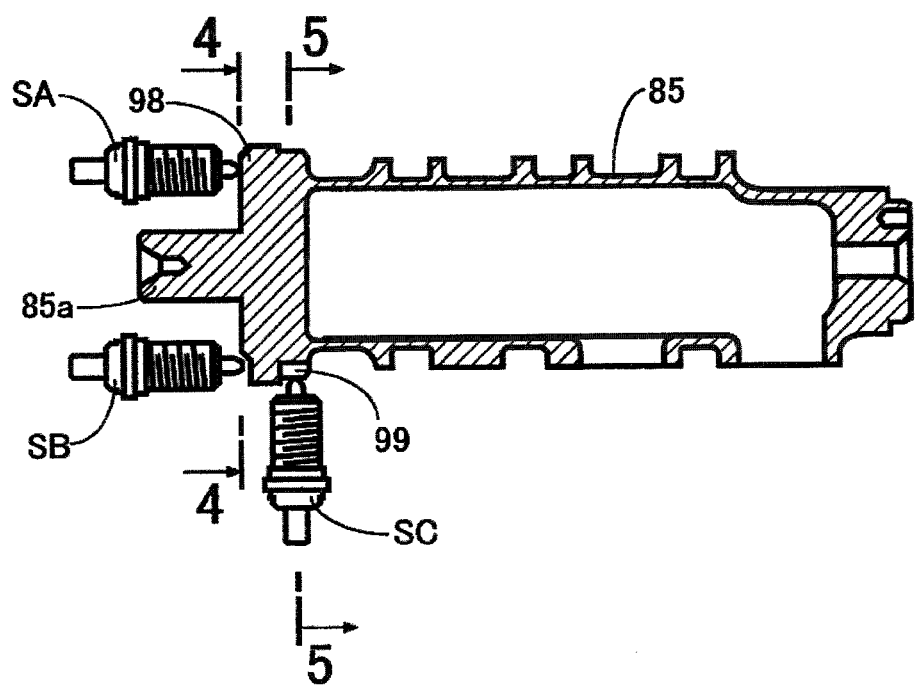
FIG. 3 is a vertical cross-sectional side view showing the arrangement of three switches and a shift drum in a simplified manner.
Figure 4:
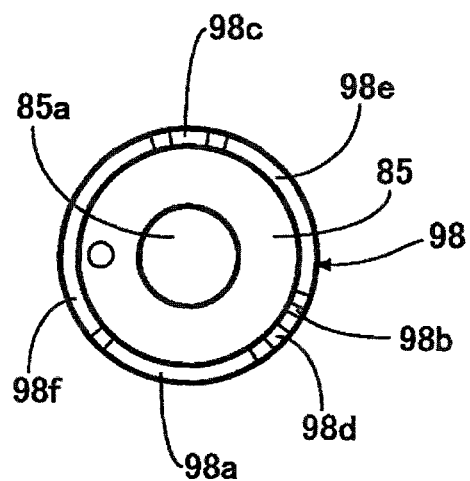
FIG. 4 is a view taken as viewed in an arrow direction from a line 4-4 in FIG. 3.

In FIG. 3 and FIG. 4, projection rows that constitute a plurality of detecting object portion rows are formed on the other end portion of the shift drum 85. In this embodiment, first and second projection rows 98, 99 are formed on the other end portion of the shift drum 85. The first projection row 98 includes first to third projecting portions 98a, 98b, 98c that are arranged at three portions of the shift drum 85 in a spaced-apart manner in the circumferential direction of the shift drum 85 and constitute detecting object portions respectively, and three valley portions 98d, 98e, 98f each of which is arranged between each two projecting portions out of the projecting portions 98a, 98b, 98c. The first to third projecting portions 98a to 98c are formed on the other end surface of the shift drum 85 in a state where the first to third projecting portions 98a to 98c project in the axial direction from the other end surface of the shift drum 85.

Figure 5:
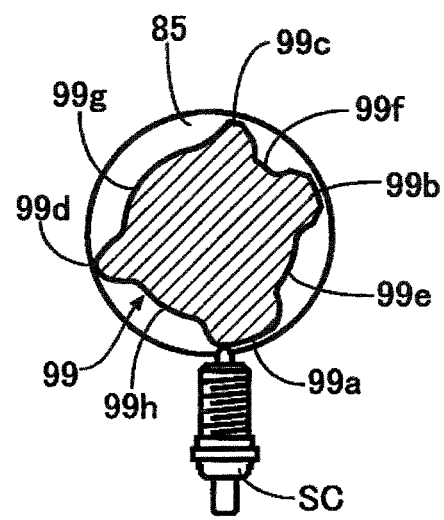
FIG. 5 is a cross-sectional view taken along a line 5-5 in FIG. 3.

To explain this embodiment also by reference to FIG. 5, the second projection row 99 includes fourth to seventh projecting portions 99a, 99b, 99c, 99d that are arranged at a plurality portions of the shift drum 85 in a spaced-apart manner in the circumferential direction of the shift drum 85 and constitute detecting object portions, and four valley portions 99e, 99f, 99g, 99h each of which is arranged between each two projecting portions out of the projecting portions 99a to 99d. The fourth to seventh projecting portions 99a to 99d are formed on an outer periphery of the other end portion of the shift drum 85 in a state where the fourth to seventh projecting portions 99a to 99d project in the radial direction from the other end portion of the shift drum 85.

Figure 6:
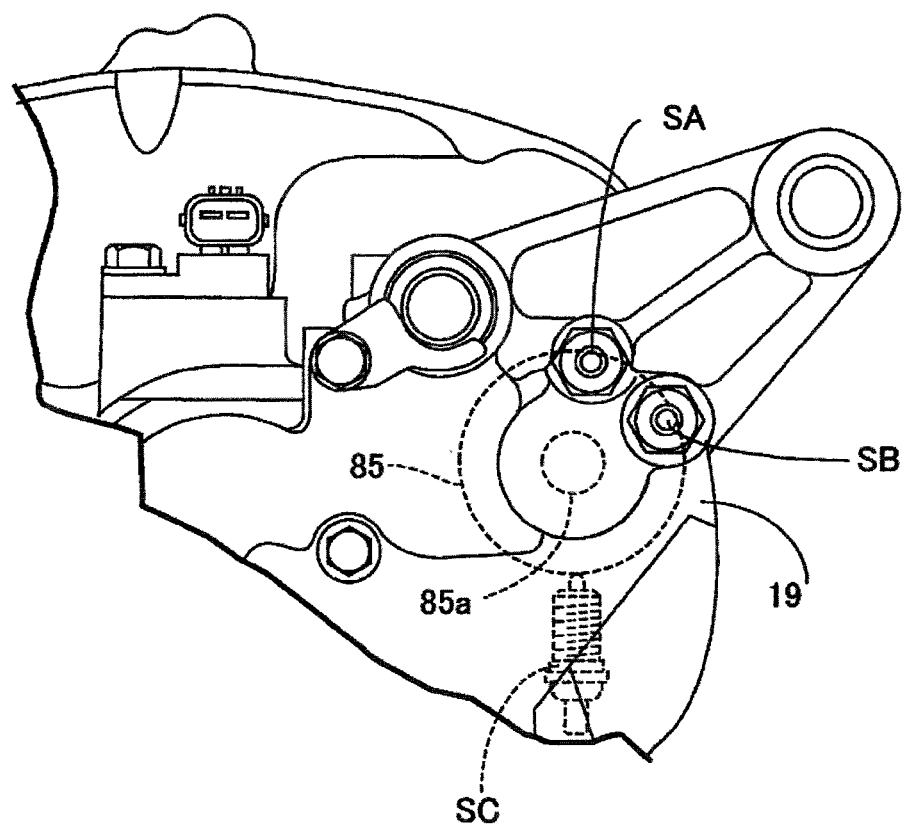
FIG. 6 is a view as viewed in the direction indicated by an arrow 6 in FIG. 2.

To explain this embodiment also by reference to FIG. 6, a plurality of switches are fixedly arranged at positions corresponding to the first and second projection rows 98, 99 on a one by one basis such that a switching mode is changed from an OFF state to an ON state in response to the detection of the projecting portions of the plurality of projection rows, that is, in this embodiment, the projecting portions 98a to 98c, 99a to 99d of the first and second projection rows 98, 99. In this embodiment, first and second switches SA, SB corresponding to the first projection row 98 are fixed to the crankcase 19 while having respective center axes thereof parallel to the axis of the shift drum 85, and a third switch SC corresponding to the second projection row 99 is fixed to the crankcase 19 while having a center axis thereof arranged orthogonal to the axis of the shift drum 85.

Figure 7:
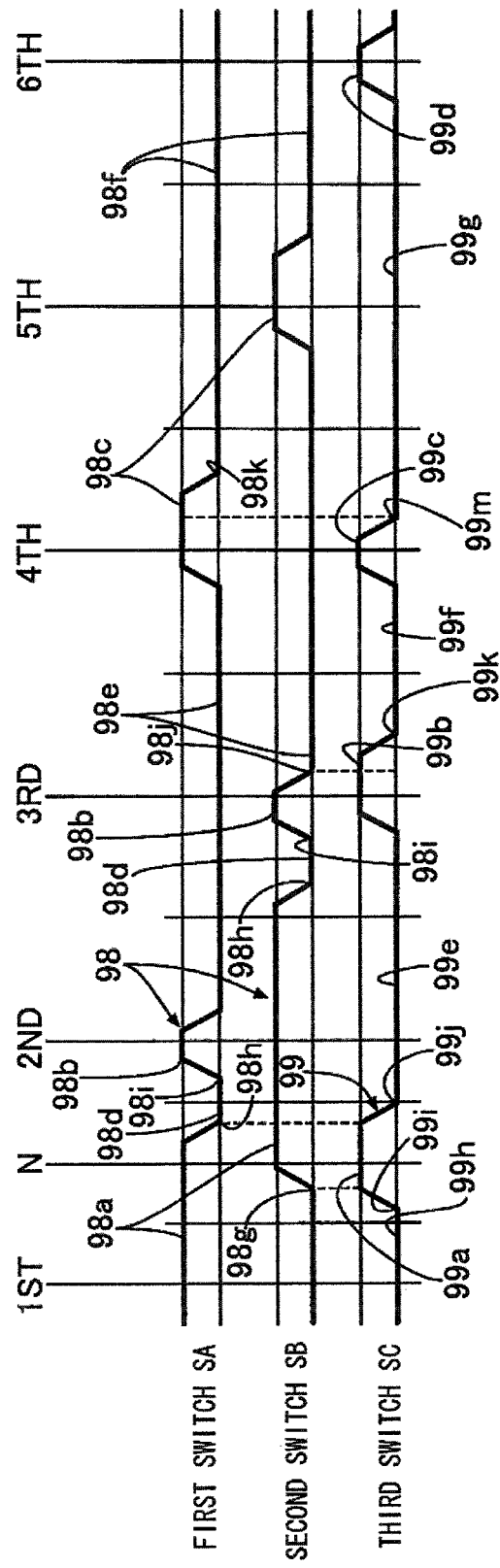
FIG. 7 is a view showing the relationship between first and second projection rows and first to third switches developed in the circumferential direction of a shift drum.

To explain this embodiment also by reference to FIG. 7, on the shift drum 85, the first-speed position to the sixth-speed position are arranged in a spaced-apart manner in the circumferential direction while arranging the neutral position between the first-speed position and the second-speed position. The first projection row 98 is formed to have the first projecting portion 98a that is detected by the first switch SA at the first-speed position (1ST) and the neutral position (N), the second projecting portion 98b that is detected by the first switch SA at the second-speed position (2ND), and the third projecting portion 98c that is detected by the first switch SA at the fourth-speed position (4TH). On the other hand, the second switch SB is arranged corresponding to the first projection row 98 used in common by the first switch SA such that the second switch SB is arranged at the shift position higher than the shift position of the first switch SA by one speed. The second switch SB detects the first projecting portion 98a at the neutral position and the second-speed position, detects the second projecting portion 98b at the third-speed position (3RD), and detects the third projecting portion 98c at the fifth-speed position (5TH). The third projection row 99 is formed to have the fourth projecting portion 99a that is detected by the third switch SC at the neutral position, the fifth projecting portion 99b that is detected by the third switch SC at the third-speed position, the sixth projecting portion 99c that is detected by the third switch SC at the fourth-speed position, and the seventh projecting portion 99d that is detected by the third switch SC at the sixth-speed position (6TH).

Figure 8:
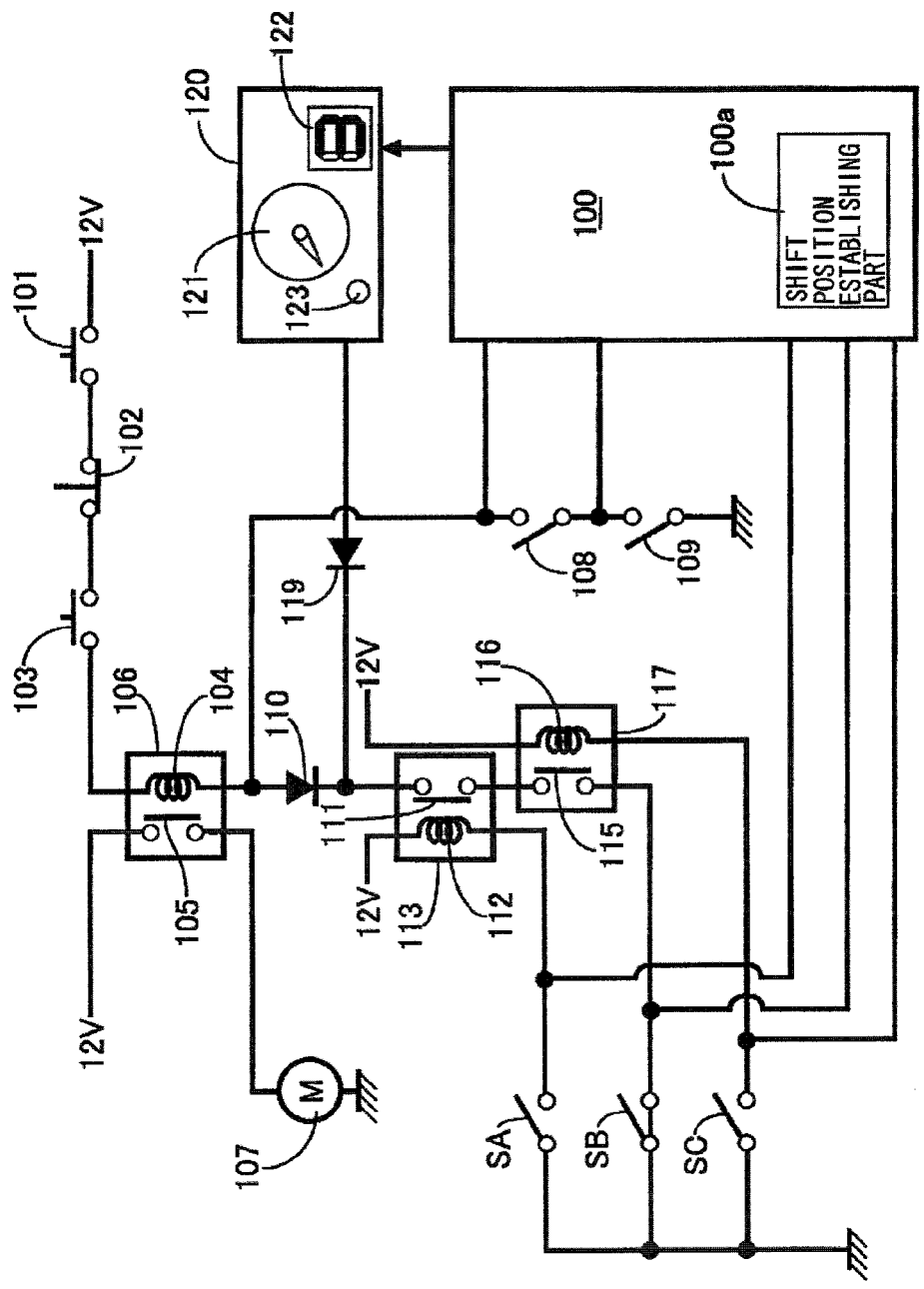
FIG. 8 is a view showing the constitution of an electronic circuit for determining a shift position.

In FIG. 8, the turning on and off of the first to third switches SA, SB, SC are inputted to an electronic control unit 100 that includes a shift position determining means. Based on a detection logic that is a combination of "1" generated when the first, second and third switches SA, SB, SC detect the projecting portions 98a to 98c, 99a to 99d and are brought into an ON state and "0" generated when the first, second and third switches SA, SB, SC are in an OFF state, the electronic control unit 100 determines a shift position by collating the shift position allocated to the detection logic.

A vehicle-mounted battery is connected to the electronic control unit 100 through a series circuit that includes a main switch 101 for starting the engine E, an engine stop switch 102, a start switch 103 and a first relay coil 104. The engine stop switch 102 is a normally-closed switch. The first relay coil 104 constitutes a first relay 106 together with a first relay switch 105 arranged between the battery and a starter motor 107.

A connection point between the first relay coil 104 and the electronic control unit 100 is connected to the ground through a series circuit constituted of a clutch lever switch 108 and a side stand switch 109. A connection point between the clutch lever switch 108 and the side stand switch 109 is also connected to the electronic control unit 100 for inputting the turning on and off of the switches 108, 109 to the electronic control unit 100.

A connection point between the first relay coil 104 and the electronic control unit 100 is connected to the ground through a series circuit that includes a first diode 110, a second relay switch 111, a third relay switch 115 and the second switch SB. A series circuit that includes a second relay coil 112 forming a second relay 113 together with the second relay switch 111 and the first switch SA is connected between the battery and the ground. A series circuit that includes a third relay coil 116 forming a third relay 117 together with the third relay switch 115 and the third switch SC is arranged between the battery and the ground.

A connection point between the second relay coil 112 and the first switch SA, a connection point between the third relay switch 115 and the second switch SB, and a connection point between the third relay coil 116 and the third switch SC are connected to the electronic control unit 100 in parallel for inputting the turning on and off of the first, second and third switches SA, SB and SC to the electronic control unit 100.

A meter unit 120 provided to the motorcycle includes a vehicle speed meter 121 indicating a vehicle speed; a shift indicator 122 that indicates a shift position based on information from the electronic control unit 100 and a neutral indicator 123 that is turned on when the multi stage transmission M is in a neutral state. The neutral indicator 123 is connected to the connection point between the first diode 110 and the second relay switch 111 through a second diode 119. More specifically, the neutral indicator 123 is turned on when the first switch SA is turned on so that the second relay coil 112 is excited whereby the second relay switch 111 is turned on, the third switch SA is turned on so that the third relay switch 115 is excited whereby the third relay switch SC is turned on, and the second switch SB is turned on.

The electronic control unit 100 includes a shift position establishing part 100a. The shift position establishing part 100a establishes the shift position as a new shift position when the detection logic from a detection logic corresponding to an established shift position in an established state to a detection logic different from a detection logic corresponding to the established shift position in an established state and the detection logic after the transition is a detection logic corresponding to a shift position changeable from the established shift position next. While, the shift position establishing part 100a sets the new shift position not yet established when the detection logic is a detection logic other than the detection logic corresponding to the shift position changeable next. When a present shift position determined by the collation is a shift position established by the shift position establishing part 100a, the electronic control unit 100 outputs shift position information corresponding to the established shift position to the shift indicator 122, while when the present shift position is not yet established by the shift position establishing part 100a, the electronic control unit 100 outputs information corresponding to non-establishment of the shift position to the indicator 122.

Due to the relative arrangement between the first to third switches SA, SB, SC and the first and second projection rows 98, 99 shown in FIG. 7, detection logics described in the following Table are allocated to the respective shift positions of the multi-stage transmission M.

TABLE 2

| | first switch | second switch | third switch |
|---|---|---|---|
| first speed | 1 | 0 | 0 |
| neutral | 1 | 1 | 1 |
| second speed | 1 | 1 | 0 |

TABLE 2-continued

|  | first switch | second switch | third switch |
|---|---|---|---|
| third speed | 0 | 1 | 1 |
| fourth speed | 1 | 0 | 1 |
| fifth speed | 0 | 1 | 0 |
| sixth speed | 0 | 0 | 1 |

Due to such allocation of the detection logics, at the specified shift positions, at the neutral position, the second speed position, the third speed position, and the fourth speed position in this embodiment, two switches out of the first to third switches SA, SB, SC are brought into an ON state from an OFF state by detecting the projecting portions individually corresponding to these switches. The shift position is changeable next to the specified shift position from a shift position in front of or behind the specified shift position due to irregularity in detection timing of two switches. However, there is a possibility that a detection logic corresponding to a shift position different from the specified shift position is generated. Accordingly, the first and second projection rows 98, 99 are configured such that timing at which one of both switches is brought into an ON state comes earlier than timing at which the other switch is brought into an ON state when the shift position is changed to the specified shift position.

More specifically, in the shift of the shift position from the first speed position to the neutral position, when the second switch S2 is turned on in response to the detection of the first projecting portion 98a of the first projection row 98 earlier than the turning on of the third switch S3 in response to the detection of the fourth projecting portion 99a of the second projection row 99, the detection logic "1, 1, 0" of the second speed position is generated during one period in the course of the transition from the detection logic "1, 0, 0" of the first speed position to the detection logic "1, 1, 1" of the neutral position. Accordingly, rising timing 99i of the fourth projecting portion 99a detected by the third switch SC from a first speed side is set earlier than rising timing 98g of the first projecting portion 98a detected by the second switch SB such that the third switch S3 is turned on in response to the detection of the fourth projecting portion 99a of the second projection row 99 earlier than the turning on of the second switch S2 in response to the detection of the first projecting portion 98a of the first projection row 98. As a result, the detection logic "1, 0, 1" of the fourth speed position is generated during one period in the course of the transition from the detection logic "1, 0, 0" of the first speed position to the detection logic "1, 1, 1" of the neutral position. However, there is no possibility that the shift position is changed from the first speed position to the fourth speed position. Thus, the electronic control unit 100 can ignore the generation of such detection logic.

In the shift of the shift position from the second speed position to the neutral position, when the first switch S1 is turned on in response to the detection of the first projecting portion 98a of the first projection row 98 earlier than the turning on of the third switch S3 in response to the detection of the fourth projecting portion 99a of the second projection row 99, the detection logic "1, 1, 0" of the second speed position is generated after the generation of the detection logic "0, 1, 0" of the fifth speed position that can be ignored in the course of the transition from the detection logic "1, 1, 0" of the second speed position to the detection logic "1, 1, 1" of the neutral position. Accordingly, rising timing 99j of the fourth projecting portion 99a detected by the third switch SC from a second speed side is set earlier than rising timing 98h of the first projecting portion 98a detected by the first switch SA such that the third switch SC is turned on in response to the detection of the fourth projecting portion 99a of the second projection row 99 earlier than the turning on of the first switch SA in response to the detection of the first projecting portion 98a of the first projection row 98.

In the shift of the shift position from the neutral position to the second speed position, when the first switch SA is turned on in response to the detection of the second projecting portion 98b of the first projection row 98 earlier than the turning on of the second switch SB in response to the detection of the first projecting portion 98a of the first projection row 98, the detection logic "1, 0, 0" of the first speed position is generated in the course of the transition from the detection logic "1, 1, 1" of the neutral position to the detection logic "1, 1, 0" of the second speed position. Accordingly, the first projecting portion 98a detected by the second switch SB is formed in an elongated manner in the circumferential direction of the shift drum 85 so that the first projecting portion 98a detected by the second switch SB rises earlier than rising timing 98i of the second projecting portion 98b detected by the first switch SA whereby the second switch SB is turned on in response to the detection of the first projecting portion 98a of the first projection row 98 earlier than the turning on of the first switch SA in response to the detection of the second projecting portion 98b of the first projection row 98.

In the shift of the shift position from the fourth speed position to the third speed position, when the second switch SB is turned on in response to the detection of the second projecting portion 98b of the first projection row 98 earlier than the turning on of the third switch S3 in response to the detection of the fifth projecting portion 99b of the second projection row 99, the detection logic "0, 1, 0" of the fifth speed position is generated during one period in the course of the transition from the detection logic "1, 0, 1" of the fourth speed position to the detection logic "0, 1, 1" of the third speed position. Accordingly, rising timing 99k of the fifth projecting portion 99b detected by the third switch SC from a fourth speed side is set earlier than rising timing 98j of the second projecting portion 98b detected by the second switch SB from the fourth speed side such that the third switch SC is turned on in response to the detection of the fifth projecting portion 99b of the second projection row 99 earlier than the turning on of the second switch SB in response to the detection of the second projecting portion 98a of the first projection row 98.

In the shift of the shift position from the fifth speed position to the fourth speed position, when the third switch SC is turned on in response to the detection of the sixth projecting portion 99c of the second projection row 99 earlier than the turning on of the first switch SA in response to the detection of the third projecting portion 98c of the first projection row 98, the detection logic "0, 0, 1" of the sixth speed position is generated during one period in the course of the transition from the detection logic "0, 1, 0" of the fifth speed position to the detection logic "1, 0, 1" of the fourth speed position. Accordingly, rising timing 98k of the third projecting portion 98c detected by the first switch SA from a fifth speed side is set earlier than rising timing 99m of the sixth projecting portion 99c detected by the third switch SC from the fifth speed side such that the first switch SA is turned on in response to the detection of the third projecting portion 98c of the first projection row 98 earlier than the turning on of the third switch SC in response to the detection of the sixth projecting portion 99c of the second projection row 99.

More specifically, at the neutral position, rising timing 99i of the fourth projecting portion 99a detected by the third switch SC from a first speed side is set earlier than rising timing 98g of the first projecting portion 98a detected by the second switch SB from a first speed side, and rising timing 99j of the fourth projecting portion 99a from a second speed side is set earlier than rising timing 98h of the first projecting portion 98a detected by the first switch SA from a second speed side. At the second speed position, rising timing 98g of the first projecting portion 98a detected by the second switch SB from a neutral side is set earlier than rising timing 98i of the first projecting portion 98a detected by the first switch SA from a neutral side. At the third speed position, rising timing 99k of the fifth projecting portion 99b detected by the third switch SC from a fourth speed side is set earlier than rising timing 98j of the second projecting portion 98b detected by the second switch SB from a fourth speed side. At the fourth speed position, rising timing 98k of the third projecting portion 98c detected by the first switch SA from a fifth speed side is set earlier than rising timing 98m of the sixth projecting portion 99c detected by the third switch SC from a fifth speed side.

Further, at the specified shift positions (neutral position, second speed position, third speed position, and fourth speed position), the first and second projection rows 98, 99 are configured such that rising of the projecting portion detected by the other switch of two switches is started after rising of the projecting portion detected by one of two switches is completed. In this embodiment, when the shift position is changed from the first speed position to the neutral position, rising of the first projecting portion 98a detected by the second switch SB starts from the completion of rising of the fourth projecting portion 99a detected by the third switch SC. When the shift position is changed from the second speed position to the neutral position, rising of the first projecting portion 98a detected by the first switch SA starts from the completion of rising of the fourth projecting portion 99a detected by the third switch SC from a second speed side. When the shift position is changed from the neutral position to the second speed position, rising of the first projecting portion 98a detected by the first switch SA starts in a state where rising of the first projecting portion 98a detected by the second switch SB from a neutral side is completed. When the shift position is changed from the fourth speed position to the third speed position, rising of the second projecting portion 98b detected by the second switch SB starts from the completion of rising of the fifth projecting portion 99b detected by the third switch SC. When the shift position is changed from the fifth speed position to the fourth speed position, rising of the sixth projecting portion 99c detected by the third switch SC starts from the completion of rising of the third projecting portion 98c detected by the first switch SA.

In the electronic control unit 100, a predetermined detection logic corresponding to at least one of the first speed position, the neutral position and the second speed position that are set as predetermined shift positions expected to be established at the time of starting the engine E mounted on a vehicle is set as a detection logic that is not generated at any moment other than the predetermined shift position at least between the first speed position and the third speed position, and the electronic control unit 100 that is started together with the engine E establishes an initial shift position after starting the electronic control unit 100 in response to the detection of the predetermined detection logic.

The first and second projection rows 98, 99 are configured such that a state where the detection logic becomes "0, 0, 0" is generated when the shift position is changed between shift positions on a high speed side of third or more speed positions, and the shift position to the predetermined detection logic from the detection logic other than the "0, 0, 0" when the shift position is changed to the predetermined shift position, and the electronic control unit 100 outputs information corresponding to non-establishment of the shift position when the predetermined detection logic is generated immediately after the generation of the detection logic "0, 0, 0."

The predetermined shift positions are the first speed position, the neutral position, and the second speed position in this embodiment. The detection logic of the first speed position is "1, 0, 0." As shown in FIG. 7, the detection logic "1, 0, 0" is not generated at any positions other than the first speed position among the first to third speed positions. Although a state indicative of "1, 0, 0" is generated temporarily between the fourth speed position and the fifth speed position, the possibility that the fourth speed position is established at the time of starting the engine E is extremely low. Thus, such a state can be ignored. Further, the detection logic of the neutral position is "1, 1, 1" and hence, such a detection logic is not generated at any moment other than the neutral position as shown in FIG. 7. The detection logic of the second speed position is "1, 1, 0," and such a detection logic is not also generated at any moment other than the second speed position as shown in FIG. 7.

The shift indicator 122 includes a 7 segment display part, for example. By combining turnings on and off of the respective segments, the first to sixth speed positions are displayed. When the shift position is in the neutral position, the shift indicator 122 is brought into a non-display state, and the neutral indicator 123 is turned on.

Figure 9:
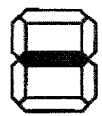
FIG. 9 is a view showing a display of a shift indicator in a state where a shift position is not yet established.

The shift indicator 122 displays an object other than the shift position when information corresponding to non-establishment of the shift position is inputted from the electronic control unit 100. By displaying a lighting portion as a black portion, a center segment is turned on to display "-" as shown in FIG. 9, for example.

Figure 10:
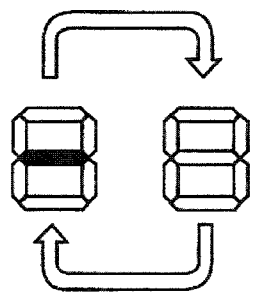
FIG. 10 is a view showing a display of the shift indicator when an error occurs in the system.

When an error occurs on the system by disconnection or the like by a chance, the electronic control unit 100 flickers "-" on the shift indicator 122 by repeating the "-" display and a non-display state as shown in FIG. 10.

Figure 11:
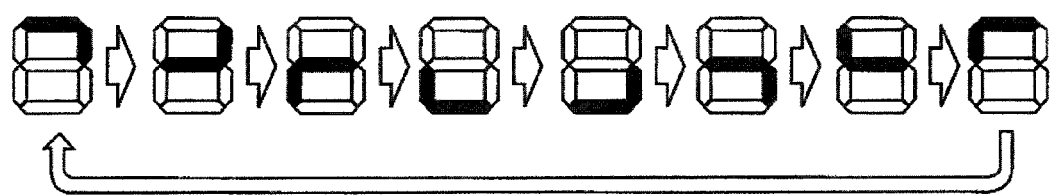
FIG. 11 is a view showing a display of the shift indicator when a shift position is not established at the time of starting an engine.

When the shift position cannot be established at the time of starting the engine E, the present shift position cannot be determined. Thus, the electronic control unit 100 allows the shift indicator 122 to perform a display as shown in FIG. 11. More specifically, the establishment of the initial shift position after starting of the engine E can be performed only when the detection logic corresponding to the first speed position, the neutral position, or the second speed position is established. Accordingly, assuming a case where the engine E is started in a state where the shift position is on a high speed side exceeding the third speed position, the shift indicator 122 performs a display where two segments arranged adjacent to each other among 7 segments are turned on, and the turn-on positions of two segments are sequentially changed, for example, and such a display is continued until the shift position is changed to the second speed position or below. A change in turn-on positions may be set in the direction opposite to the direction shown in FIG. 11 and the number of segments that are turned on may be one, three or more besides two.

Next, to explain the manner of operation of this embodiment, the electronic control unit 100 includes a shift position establishing part 100a that establishes the shift position as a new shift position when the detection logic from a detection logic corresponding to an established shift position in an established state to a detection logic different from the detection logic corresponding to the established shift position and the detection logic after the transition is a detection logic corresponding to a shift position changeable from the established shift position next, and sets the new shift position not yet established when the detection logic after the transition is a detection logic other than the detection logic corresponding to the shift position to which the shift position is changeable next. When a present shift position determined by the collation is a shift position established by the shift position establishing part 100a, the electronic control unit 100 outputs shift position information corresponding to the established shift position to the shift indicator 122, while when the present shift position is not a shift position established by the shift position establishing part 100a, the electronic control unit 100 outputs unestablished information. Accordingly, the determination of the accurate shift position can be performed such that the shift position that has no possibility of being selected as the destination of shift is not outputted.

In a state where a relative arrangement between the switches and the detecting object portion rows is set such that the two switches out of three switches SA, SB, SC are brought into an ON state from an OFF state by detecting the detecting object portions individually corresponding to the switches at specified shift position, to avoid the generation of a detection logic corresponding to a shift position different from the specified shift position although being changeable thereto next from a shift position in front of or behind the specified shift position due to an irregularity in the detection timing of the two switches, the first and second projection rows 98, 99 are configured such that timing at which one of both switches is brought into an ON state comes earlier than timing at which the other switch is brought into an ON state when the shift position is changed to the specified shift position. Accordingly, it is possible to mechanically eliminate a possibility that the detection logic that does not correspond to the specified shift position that is an actual shift position is generated. Thus, a more reliable determination of the shift position can be realized.

The first and second projection rows 98, 99 includes the plurality of projecting portions 98a to 98c, 99a to 99d and the valley portions 98d to 98f, 99e to 99h that are arranged between the projecting portions 98a to 98c, 99a to 99d, and are configured such that the rising of the projecting portion that the other switch detects at the specified shift position is started after the completion of the rising of the projecting portion that one switch detects at the specified shift position. Accordingly, it is possible to completely eliminate a possibility that an irregularity is generated in detection timings of two switches.

A predetermined detection logic corresponding to a predetermined shift position that is expected to be established at the time of the starting the engine E is set as a detection logic that is not generated at any moment other than the predetermined shift position, and the electronic control unit 100 that is started together with the engine E establishes an initial shift position after the starting of the electronic control unit 100 in response to the detection of the predetermined detection logic. Accordingly, the initial shift position can be surely established.

The neutral position is set as the predetermined shift position in view of a fact that the shift position that is used frequently at the time of starting the engine E is the neutral position. Accordingly, the shift position can be established at a relatively early stage after starting the engine E. Further, the second speed position is set as the predetermined shift position in view of a fact that the second speed position is used at the time of starting a vehicle. Accordingly, the shift position can be established at a relatively early stage after starting the engine E.

The multi-stage transmission M is configured such that a neutral position is arranged between the first speed position and the second speed position and the shift position is changeable among the first to the sixth speed positions, and a predetermined detection logic corresponding to at least one of the first speed position, the neutral position and the second speed position that are set as predetermined shift positions expected to be established at the time of starting the engine E is set as a detection logic that is not generated at any moment other than the predetermined shift position at least between the first speed position and the third speed position, and the electronic control unit 100 that is started together with the engine E establishes an initial shift position after starting the electronic control unit 100 in response to the detection of the predetermined detection logic. Accordingly, based on the fact that the shift position on a high-speed side exceeding the third speed position is hardly taken at a relatively early stage after the starting the engine, at least one of the first speed position, the neutral position and the second speed position that is expected to be established at the time of the starting the engine E is set as the predetermined shift position, and the predetermined detection logic corresponding to the predetermined shift position is set as the detection logic that is not generated at any moment other than the predetermined shift position at least between the first speed position and the third speed position whereby the shift position can be established at a relatively early stage after starting the engine.

A state where the detection logic that is the combination of "1" generated when the first, second and third switches SA, SB, SC detect the projecting portions 98a to 98c, 99a to 99d of the first and second projection rows and are brought into an ON state, and "0" generated when the first, second and third switches SA, SB, SC are brought into an OFF state becomes "0, 0, 0" is generated when the shift position is changed between shift positions on a high speed side of third or more speed positions, when the shift change to the first speed position, the neutral position or the second speed position, that is the predetermined shift position is made, the relative arrangement between the first, the second and the third switches SA, SB, SC and the first and second projection rows 98, 99 is set such that the detection logic to a predetermined detection logic from a detection logic other than the "0, 0, 0," and the electronic control unit 100 outputs unestablished information when the predetermined detection logic is generated immediately after the generation of the detection logic of the "0, 0, 0." Accordingly, even when the predetermined detection logic appears at the shift position of the third or more speed position, the predetermined detection logic appears immediately after "0, 0, 0." Thus, it is possible to effectively eliminate the establishment of the shift position other than the predetermined shift position.

By allocating the detection logics in the Table to the respective shift positions, in performing the shift position determination of the neutral position and the first to sixth speed positions using the first, second and third switches SA, SB, SC, the shift position information and unestablished information can be outputted using the first and second projection rows that constitute the minimum number of projection rows. Further, by setting rising timings of the projecting portions at the neutral position, the second speed position, the third speed position and the fourth speed position as described above, it is possible to mechanically eliminate a possibility that the detection logic that does not correspond to an actual shift position is generated in the course of the shift change. Thus, a more reliable determination of the shift position can be realized.

The shift indicator 122 that displays the shift position based on inputting of the shift position information displays objects other than the shift position when unestablished information is inputted. Thus, the shift position can be accurately grasped.

Although the embodiment of the invention has been explained heretofore, the invention is not limited to the above-mentioned embodiment and various design modifications are conceivable without departing from the gist of the invention.

The sequential-type multi-stage transmission M mounted on a motorcycle is explained in the above-mentioned embodiment. However, the invention is not limited to the motorcycle, and is also applicable to a sequential-type multi-stage transmission mounted on a three-wheeled motorcycle or a four-wheeled vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shift position detecting device comprising:
a plurality of detecting object portion rows each including detecting object portions arranged at a plurality of places in a spaced-apart manner in a circumferential direction of a shift drum constituting a part of a sequential-type multi-stage transmission that establishes a shift position by selectively establishing gear trains of a plurality of shift stages, said plurality of detecting object portion rows being mounted on the shift drum;
a plurality of switches fixedly arranged at least one by one at positions corresponding to the plurality of detecting object portion rows such that a switching mode is changed from an OFF state to an ON state in response to the detection of the detecting object portion; and
a shift position determining means for determining a shift position by collating a shift position allocated to a detection logic formed of a combination of turning on and off of the switches based on the detection logic;
wherein the shift position determining means includes a shift position establishing part for establishing the shift position as a new shift position when the detection logic makes a transition from a detection logic corresponding to an established shift position in an established state to a detection logic different from the detection logic corresponding to the established shift position and the detection logic after the transition is a detection logic corresponding to a shift position changeable from the established shift position next, and sets the new shift position not yet established when the detection logic after the transition is a detection logic other than the detection logic corresponding to the shift position changeable next; and
when a present shift position determined by the collation is a shift position established by the shift position establishing part, the shift position determining means outputs shift position information corresponding to the established shift position, while when the present shift position is not established by the shift position establishing part, the shift position determining means outputs information corresponding to non-establishment of the shift position.

2. The shift position detecting device according to claim 1, wherein in a state where a relative arrangement between the switches and the detecting object portion rows is set such that two of the plurality of switches are brought into an ON state from an OFF state by detecting the detecting object portions individually corresponding to the two switches at a specified shift position, to avoid the generation of a detection logic corresponding to a shift position different from the specified shift position although being changeable thereto next from a shift position in front of or behind the specified shift position due to irregularity in detection timing of the two of the plurality of switches, the detecting object portion rows are configured such that timing at which a first of the two of the plurality of switches is brought into an ON state comes earlier than timing at which a second of the two of the plurality of switches is brought into an ON state when the shift position is changed to the specified position.

3. The shift position detecting device according to claim 2, wherein the detecting object portion row includes a plurality of projecting portions including the plurality of detecting object portions arranged in a spaced-apart manner in the circumferential direction of the shift drum and valley portions that are arranged between the projecting portions, and the detecting object portion row includes a projection row where the rising of the projecting portion that the second of the two of the plurality of switches detects at the specified shift position is started after the completion of the rising of the projecting portion that the first of the two of the plurality of switches detects at the specified shift position.

4. The shift position detecting device according to claim 3, wherein a predetermined detection logic corresponding to a predetermined shift position that is expected to be established at the time of starting an engine mounted on a vehicle is set as a detection logic that is not generated at any moment other than the predetermined shift position, and the shift position determining means that is started together with the engine establishes an initial shift position after the starting of the shift position determining means in response to the detection of the predetermined detection logic.

5. The shift position detecting device according to claim 4, wherein the predetermined shift position is a second speed position.

6. The shift position detecting device according to claim 3, wherein the multi-stage transmission is configured such that a neutral position is arranged between a first speed position and a second speed position and a shift position is changeable among the first and second speed positions and among a third, a fourth, a fifth and a sixth speed positions, and a predetermined detection logic corresponding to at least one of the first speed position, the neutral position and the second speed position that are set as predetermined shift positions expected to be established at the time of starting an engine mounted on a vehicle is set as a detection logic that is not generated at any moment other than the predetermined shift position at least between the first speed position and the third speed position, and the shift position determining means that is started together with the engine establishes an initial shift position after starting the shift position determining means in response to the detection of the predetermined detection logic.

7. The shift position detecting device according to claim 3, wherein to the shift position of the multi-stage transmission that is configured to change a speed position among first to sixth speed positions while arranging a neutral position between the first speed position and the second speed position, detection logics described in a following table where "1" generated when the first and the second switches and a third switch detect the projecting portions and are brought into an ON state and "0" generated when the first, the second and the third switches are in an OFF state are combined with each other is allocated, the first and the second switches are arranged corresponding to a common projection row such that the second switch is arranged at the shift position higher than the shift position of the first switch by one speed, at the neutral position, rising of the projecting portion from a first speed side detected by the third switch is set earlier than the projecting portion detected by the second switch, and rising of the projecting portion from a second speed side is set earlier than the projecting portion detected by the first switch, at the second speed position, rising of the projecting portion detected by the second switch from a neutral side is set earlier than the projecting portion detected by the first switch, at the third speed position, rising of the projecting portion detected by the third switch from a fourth speed side is set earlier than the projecting portion detected by the second switch, and at the fourth speed position, rising of the projecting portion detected by the first switch from a fifth speed side is set earlier than the projecting portion detected by the third switch.

8. The shift position detecting device according to claim 3, further comprising a shift indicator for performing a display operation based on information from the shift position determining means, the shift indicator displays a shift position based on an input of the shift position information from the shift position determining means and the shift indicator displays an object to be displayed other than the shift position when the information corresponding to non-establishment of the shift position is inputted from the shift position determining means.

9. The shift position detecting device according to claim 2, wherein a predetermined detection logic corresponding to a predetermined shift position that is expected to be established at the time of starting an engine mounted on a vehicle is set as a detection logic that is not generated at any moment other than the predetermined shift position, and the shift position determining means that is started together with the engine establishes an initial shift position after the starting of the shift position determining means in response to the detection of the predetermined detection logic.

10. The shift position detecting device according to claim 9, wherein the predetermined shift position is a neutral position.

11. The shift position detecting device according to claim 9, wherein the predetermined shift position is a second speed position.

12. The shift position detecting device according to claim 2, wherein the multi-stage transmission is configured such that a neutral position is arranged between a first speed position and a second speed position and a shift position is changeable among the first and second speed positions and among a third, a fourth, a fifth and a sixth speed positions, and a predetermined detection logic corresponding to at least one of the first speed position, the neutral position and the second speed position that are set as predetermined shift positions expected to be established at the time of starting an engine mounted on a vehicle is set as a detection logic that is not generated at any moment other than the predetermined shift position at least between the first speed position and the third speed position, and the shift position determining means that is started together with the engine establishes an initial shift position after starting the shift position determining means in response to the detection of the predetermined detection logic.

13. The shift position detecting device according to claim 12, wherein the relative arrangement between the first and the second switches and a third switch and the detecting object portion rows is set such that a state where the detection logic that is the combination of "1" generated when the first, second and third switches detect the detecting object portions and are brought into an ON state and "0" generated when the first, second and third switches are brought into an OFF state becomes "0, 0, 0" is generated when the shift position is changed between shift positions on a high speed side of three or more speed positions, and the detection logic to a predetermined detection logic from a detection logic other than the "0, 0, 0" when the shift position is changed to the predetermined shift position, and the shift position determining means outputs information corresponding to non-establishment of the shift position when the predetermined detection logic is generated immediately after the generation of the detection logic of the "0, 0, 0".

14. The shift position detecting device according to claim 2, further comprising a shift indicator for performing a display operation based on information from the shift position determining means, the shift indicator displays a shift position based on an input of the shift position information from the shift position determining means and the shift indicator displays an object to be displayed other than the shift position when the information corresponding to non-establishment of the shift position is inputted from the shift position determining means.

15. The shift position detecting device according to claim 1, further comprising a shift indicator for performing a display operation based on information from the shift position determining means, the shift indicator displays a shift position based on an input of the shift position information from the shift position determining means and the shift indicator displays an object to be displayed other than the shift position when the information corresponding to non-establishment of the shift position is inputted from the shift position determining means.

16. A shift position detecting device comprising;
a plurality of detecting object portion rows each including detecting object portions arranged at a plurality of places in a spaced-apart manner in a circumferential direction of a shift drum constituting a part of a sequential-type multi-stage transmission for establishing a shift position by selectively establishing gear trains of a plurality of shift stages;
a plurality of switches fixedly arranged at least one by one at positions corresponding to the plurality of detecting object portion rows such that a switching mode is changed from an OFF state to an ON state in response to the detection of the detecting object portion; and
a shift position determining means for determining a shift position by collating a shift position allocated to a detection logic formed of a combination of turning on and off of the switches based on the detection logic;
said shift position determining means establishes the shift position as a new shift position when the detection logic makes a transition from a detection logic corresponding to an established shift position in an established state to a detection logic different from the detection logic corresponding to the established shift position and the detection logic after the transition is a detection logic corresponding to a shift position changeable from the established shift position next, and sets the new shift position not yet established when the detection logic after the transition is a detection logic other than the detection logic corresponding to the shift position changeable next;

wherein when the shift position determining means outputs shift position information corresponding to the established shift position, while when the present shift position is not established by the shift position establishing part, the shift position determining means outputs information corresponding to non-establishment of the shift position.

17. The shift position detecting device according to claim 16, wherein in a state where a relative arrangement between the switches and the detecting object portion rows is set such that two of the plurality of switches are brought into an ON state from an OFF state by detecting the detecting object portions individually corresponding to the two switches at a specified shift position, to avoid the generation of a detection logic corresponding to a shift position different from the specified shift position although being changeable thereto next from a shift position in front of or behind the specified shift position due to irregularity in detection timing of the two of the plurality of switches, the detecting object portion rows are configured such that timing at which a first of the two of the plurality of switches is brought into an ON state comes earlier than timing at which the second of the two of the plurality of switches is brought into an ON state when the shift position is changed to the specified position.

18. The shift position detecting device according to claim 17, wherein the detecting object portion row includes a plurality of projecting portions including the plurality of detecting object portions arranged in a spaced-apart manner in the circumferential direction of the shift drum and valley portions that are arranged between the projecting portions, and the detecting object portion row includes a projection row where the rising of the projecting portion that the second of the two of the plurality of switches detects at the specified shift position is started after the completion of the rising of the projecting portion that first of the two of the plurality of switches detects at the specified shift position.

19. The shift position detecting device according to claim 17, wherein a predetermined detection logic corresponding to a predetermined shift position that is expected to be established at the time of starting an engine mounted on a vehicle is set as a detection logic that is not generated at any moment other than the predetermined shift position, and the shift position determining means that is started together with the engine establishes an initial shift position after the starting of the shift position determining means in response to the detection of the predetermined detection logic.

20. The shift position detecting device according to claim 19, wherein the predetermined shift position is a neutral position.

* * * * *